United States Patent
Ikemi et al.

(10) Patent No.: US 12,451,788 B2
(45) Date of Patent: Oct. 21, 2025

(54) MAGNETIC GEARED ROTATING MACHINE AND POWER GENERATION SYSTEM

(71) Applicant: MITSUBISHI HEAVY INDUSTRIES, LTD., Tokyo (JP)

(72) Inventors: Takeshi Ikemi, Tokyo (JP); Takatoshi Matsushita, Tokyo (JP); Mikito Sasaki, Tokyo (JP); Ryoji Okabe, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 182 days.

(21) Appl. No.: 18/279,518

(22) PCT Filed: Feb. 22, 2022

(86) PCT No.: PCT/JP2022/007120
§ 371 (c)(1),
(2) Date: Aug. 30, 2023

(87) PCT Pub. No.: WO2022/202050
PCT Pub. Date: Sep. 29, 2022

(65) Prior Publication Data
US 2024/0154510 A1    May 9, 2024

(30) Foreign Application Priority Data
Mar. 22, 2021    (JP) ................. 2021-047372

(51) Int. Cl.
*H02K 49/10*    (2006.01)
(52) U.S. Cl.
CPC .................. *H02K 49/102* (2013.01)
(58) Field of Classification Search
CPC ........ H02K 49/10; H02K 49/102; H02K 7/11; H02K 21/16
See application file for complete search history.

(56) References Cited

U.S. PATENT DOCUMENTS

| 3,645,650 A | 2/1972 | Laing |
| 2010/0283345 A1 | 11/2010 | Atallah et al. |

(Continued)

FOREIGN PATENT DOCUMENTS

| GB | 2549449 A | 10/2017 |
| JP | S49-33308 B1 | 9/1974 |

(Continued)

OTHER PUBLICATIONS

English translation of JP-2016-135014-A (Year: 2016).*

(Continued)

*Primary Examiner* — Tulsidas C Patel
*Assistant Examiner* — Joshua Kiel M Rodriguez
(74) *Attorney, Agent, or Firm* — Osha Bergman Watanabe & Burton LLP (57) ABSTRACT

A magnetic geared rotating machine, includes: a stator which includes a plurality of stator magnets arranged so as to be aligned in a circumferential direction; a rotor which includes a plurality of rotor magnets arranged so as to be aligned in the circumferential direction, and in which the number of magnetic poles of the plurality of rotor magnets is less than the number of magnetic poles of the plurality of stator magnets; and a magnetic pole piece rotor which includes a plurality of magnetic pole pieces arranged so as to be aligned in the circumferential direction. Each of the magnetic pole pieces has: a first face opposed to the rotor in a radial direction; and a second face opposed to the stator in the radial direction and having a circumferential length longer than a circumferential length of the first face.

7 Claims, 8 Drawing Sheets

(56) References Cited

U.S. PATENT DOCUMENTS

| | | |
|---|---|---|
| 2011/0012458 A1 | 1/2011 | Atallah et al. |
| 2013/0134815 A1 | 5/2013 | Powell et al. |
| 2015/0075886 A1 | 3/2015 | Tonari et al. |
| 2022/0052596 A1 | 2/2022 | Ukaji et al. |

FOREIGN PATENT DOCUMENTS

| | | |
|---|---|---|
| JP | 2008-193823 A | 8/2008 |
| JP | 5643857 B2 | 12/2014 |
| JP | 2015-061423 A | 3/2015 |
| JP | 2016-019365 A | 2/2016 |
| JP | 2016-135014 A | 7/2016 |
| WO | 2009-050421 A1 | 4/2009 |
| WO | 2020-174936 A1 | 9/2020 |

OTHER PUBLICATIONS

International Search Report Issued in Corresponding Application No. PCT/JP2022/007120; dated May 17, 2022. (9 Pages).

International Preliminary Report on Patenability issued in corresponding Application No. PCT/JP2022/007120; dated Oct. 5, 2023. (12 pages with English Translation).

Extended European Search Report Issued in Corresponding EP Application No. 22 77 4850.6, dated Jul. 17, 2024. (9 Pages).

* cited by examiner

MAGNETIC GEARED ROTATING MACHINE AND POWER GENERATION SYSTEM

TECHNICAL FIELD

The present disclosure relates to a magnetic geared rotating machine and a power generation system.

This application claims the priority of Japanese Patent Application No. 2021-047372 filed on Mar. 22, 2021, the content of which is incorporated herein by reference.

BACKGROUND

Conventionally, a magnetic geared rotating machine is known which converts a rotation speed between two rotors to transmit a torque. For example, a magnetic geared rotating machine disclosed in Patent Document 1 includes, in order from the radially outer side, a stator provided with a coil, an outer rotor provided with an induction magnetic pole which is a soft magnetic material, and an inner rotor provided with a permanent magnet.

CITATION LIST

Patent Literature

Patent Document 1: JP2008-193823A

SUMMARY

Technical Problem

In order to increase a transmission torque in a magnetic geared rotating machine, it is preferable that a stator is provided with a stator magnet. If the stator magnet is provided, it is necessary to reduce stator magnet losses in the stator magnet during operation of the magnetic geared rotating machine. However, the above-described document does not even disclose a configuration in which the stator magnet is provided.

The object of the present disclosure is to provide a magnetic geared rotating machine and a power generation system which are capable of reducing stator magnet losses in a stator magnet.

Solution to Problem

A magnetic geared rotating machine according to at least one embodiment of the present disclosure, includes: a stator which includes a plurality of stator magnets arranged so as to be aligned in a circumferential direction; a rotor which includes a plurality of rotor magnets arranged so as to be aligned in the circumferential direction and having the number of magnetic poles less than the number of magnetic poles of the plurality of stator magnets; and a magnetic pole piece rotor which includes a plurality of magnetic pole pieces arranged so as to be aligned in the circumferential direction. Each of the magnetic pole pieces has: a first face opposed to the rotor in a radial direction; and a second face opposed to the stator in the radial direction and having a circumferential length longer than a circumferential length of the first face.

A power generation system according to at least one embodiment of the present disclosure, includes: a prime mover; and the above-described magnetic geared rotating machine which serves as a magnetic geared generator driven by an input from the prime mover to generate power.

Advantageous Effects

According to at least one embodiment of the present disclosure, it is possible to provide a magnetic geared rotating machine and a power generation system which are capable of reducing stator magnet losses in a stator magnet.

DETAILED DESCRIPTION

Some embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

(Overview of Magnetic Geared Rotating Machine)

Figure 1A:
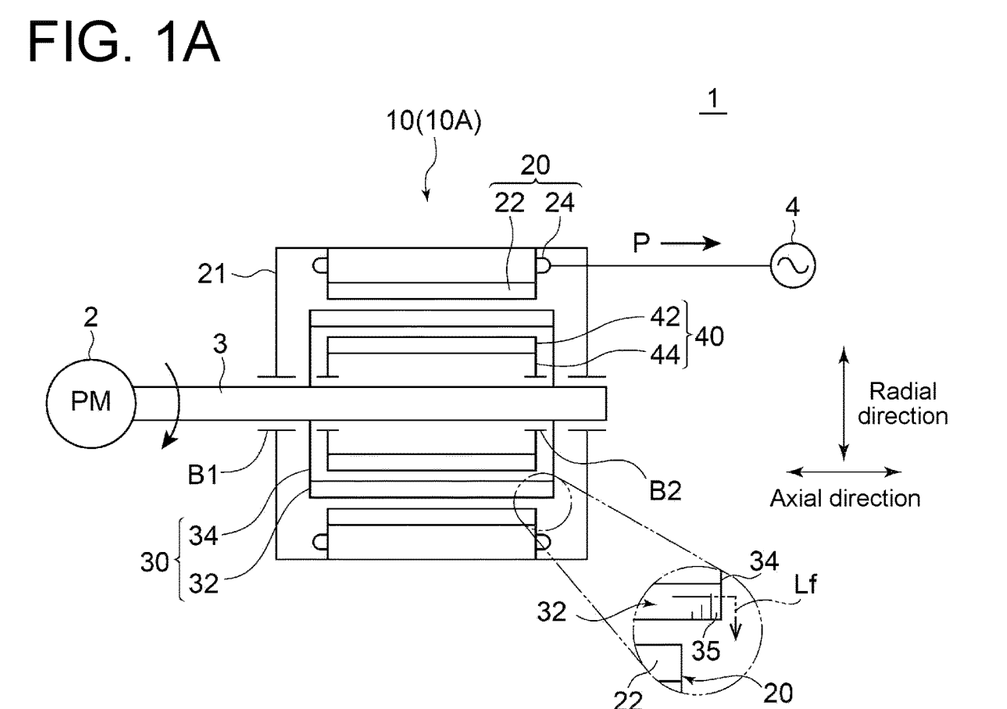
FIG. 1A is a schematic view showing a magnetic geared rotating machine according to an embodiment.
Figure 1B:
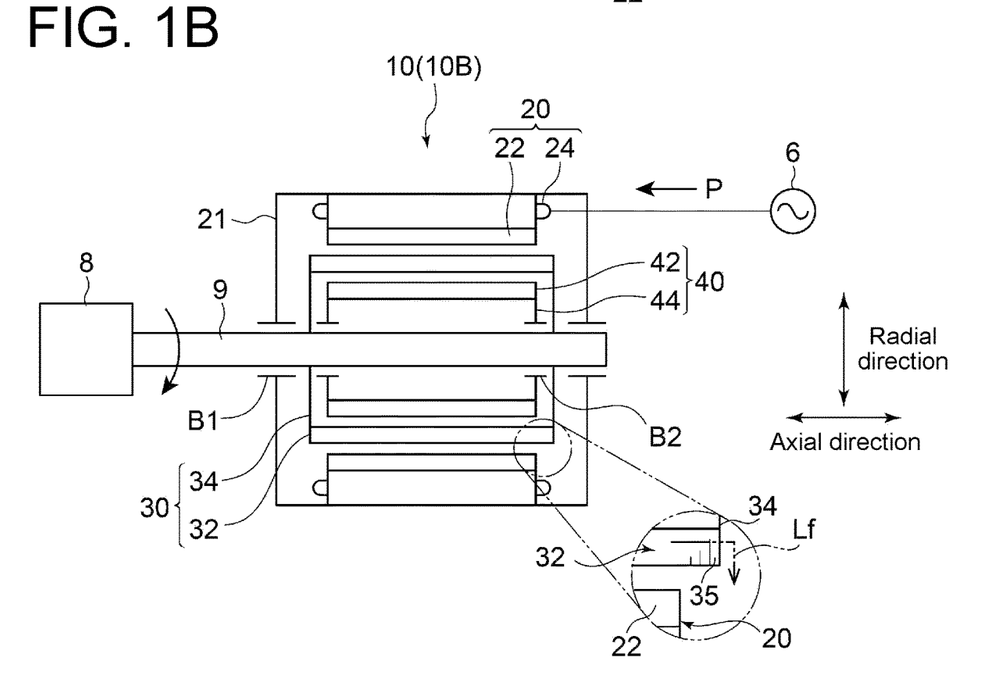
FIG. 1B is a schematic view showing a magnetic geared rotating according to another embodiment.

FIGS. 1A and 1B are each a schematic view showing an example of a magnetic geared rotating machine. Herein, in FIGS. 1A and 1B, the "axial direction" is a direction parallel to a rotational axis of a magnetic pole piece rotor 30 and a rotor 40 of a magnetic geared rotating machine 10, and the "radial direction" is a direction orthogonal to the rotational axis of the rotor 40 and a magnetic pole piece 32.

In an embodiment, as shown in FIG. 1A, the magnetic geared rotating machine 10 is a magnetic geared generator 10A driven by an input from a prime mover 2 to generate power. The magnetic geared generator 10A is configured to supply electric power P generated by the power generation to a power supply destination 4 which may be, for example, a power grid.

In another embodiment, as shown in FIG. 1B, the magnetic geared rotating machine 10 is a magnetic geared motor 10B configured to drive a rotating machine 8 upon receiving the electric power P supplied from a power supply source 6 which may be, for example, a power grid.

In the embodiment shown in FIG. 1A, the magnetic geared generator 10A constitutes part of a power generation system 1. The power generation system 1 may be, for example, a renewable energy power generation system such as a wind power generation system or a tidal current power generation system. If the power generation system 1 is a wind power generation system, the prime mover 2 is a wind turbine rotor. If the power generation system 1 is a tidal current power generation system, the prime mover 2 is a water turbine rotor.

The magnetic geared generator 10A includes a stator 20 including a stator magnet 22 and a stator winding 24, the magnetic pole piece rotor 30 including the magnetic pole piece 32, and a rotor 40 including a plurality of rotor magnets 42. In the example shown in FIG. 1A, the stator 20 is arranged inside a housing 21 for supporting a rotational shaft 3 of the prime mover 2 via a bearing B1. The magnetic pole piece rotor 30 is configured to rotate with the rotational shaft 3 of the prime mover 2. The magnetic pole piece 32 of the magnetic pole piece rotor 30 includes a plurality of axially laminated electrical steel sheets 35. The magnetic pole piece rotor 30 includes end rings 34 respectively disposed at axial both ends of the magnetic pole piece 32, and each of the end rings 34 is connected to the rotational shaft 3. The rotor 40 includes end plates 44 respectively disposed at axial both ends of the rotor magnet 42. Each of the end plates 44 is mounted on the rotational shaft 3 (or the magnetic pole piece rotor 30 rotating together with the rotational shaft 3) via a bearing B2 so as to allow the rotor 40 to rotate faster than the rotational shaft 3 and the magnetic pole piece rotor 30. The rotor 40 is disposed within a region surrounded by the rotational shaft 3 and the magnetic pole piece rotor 30 including the magnetic pole piece 32 and the end rings 34.

In the embodiment shown in FIG. 1A, the magnetic geared generator 10A has a configuration in which the stator 20, the magnetic pole piece rotor 30, and the rotor 40 are arranged in order toward the radially inner side. In another embodiment, the magnetic geared generator 10A has a configuration in which the rotor 40, the magnetic pole piece rotor 30, and the stator 20 are arranged in order toward the radially inner side. In this case, the rotor 40, the magnetic pole piece rotor 30, and the stator 20 are arranged radially inward of the cylindrical rotational shaft 3.

The above-described magnetic geared generator 10A has a structure in which a magnetic gear and a generator are integrated. The magnetic geared generator 10A is configured to convert a mechanical input from the prime mover 2 into electric power by utilizing a harmonic type magnetic gear principle and electromagnetic induction.

For example, power generation in the magnetic geared generator 10A may be performed according to the following principle. A magnetic flux of the stator magnet 22 is modulated by the magnetic pole piece 32 of the magnetic pole piece rotor (low-speed rotor) 30 rotating together with the rotational shaft 3 of the prime mover 2, and the rotor magnet 42 receives a magnetic force from the modulated magnetic field, thereby rotating the rotor (high-speed rotor) 40. At this time, the ratio (speed increasing ratio) of the rotation speed of the rotor 40 to the magnetic pole piece rotor 30 is expressed by a ratio of the number of magnetic poles $N_L$ of the magnetic pole piece 32 to the number of pole pairs $N_H$ of the rotor magnet 42 ($=N_L/N_H$). When the rotor 40 rotates, an electric current is generated in the stator winding 24 by electromagnetic induction. The number of magnetic poles $N_L$ of the magnetic pole piece 32 is less than the number of magnetic poles $N_S$ of the stator magnet 22.

During operation of the magnetic geared generator 10A, various magnetic fluxes such as an $N_H$-order magnetic flux (main magnetic flux) and a harmonic magnetic flux of higher-order than $N_H$-order (for example, an $N_H+N_S$-order magnetic flux) can occur inside the magnetic geared generator 10A. Some of these magnetic fluxes become leakage magnetic fluxes Lf axially passing through the magnetic pole pieces 32 in order to avoid the stator magnets 22, for example. If the leakage magnetic flux Lf is generated, an eddy current can be generated in the in-plane direction in each electrical steel sheet 35. Relatively large eddy currents can be generated in the electrical steel sheets 35 disposed in, for example, axial both end portions of the magnetic pole piece 32.

In the embodiment shown in FIG. 1B, the basic configuration of the magnetic geared motor 10B is common to the magnetic geared generator 10A shown in FIG. 1A.

That is, the magnetic geared motor 10B includes the stator 20 including the stator magnet 22 and the stator winding 24, the magnetic pole piece rotor 30 including the magnetic pole piece 32, and the rotor 40 including the plurality of rotor magnets 42. In the example shown in FIG. 1B, the stator 20 is fixed to the inside of the housing 21 for supporting a rotational shaft 9 of the rotating machine 8 via the bearing B1. The magnetic pole piece 32 of the magnetic pole piece rotor 30 includes the plurality of axially laminated electrical steel sheets 35. The magnetic pole piece rotor 30 includes the end rings 34 respectively disposed at the axial both ends of the magnetic pole piece 32, and each of the end rings 34 is connected to the rotational shaft 9. The rotor 40 includes the end plates 44 respectively disposed at the axial both ends of the rotor magnet 42. Each of the end plates 44 is mounted on the rotational shaft 9 (or the magnetic pole piece rotor 30 rotating together with the rotational shaft 9) via the bearing B2 so as to allow the rotor 40 to rotate faster than the rotational shaft 9 and the magnetic pole piece rotor 30. The rotor 40 is disposed within a region surrounded by the rotational shaft 9 and the magnetic pole piece rotor 30 including the magnetic pole piece 32 and the end rings 34.

In the embodiment shown in FIG. 1B, the magnetic geared motor 10B has the configuration in which the stator 20, the magnetic pole piece rotor 30, and the rotor 40 are arranged in order toward the radially inner side. In another embodiment, the magnetic geared motor 10B has the configuration in which the rotor 40, the magnetic pole piece rotor 30, and the stator 20 are arranged in order toward the radially inner side. In this case, the rotor 40, the magnetic pole piece rotor 30, and the stator 20 are arranged radially inward of the cylindrical rotational shaft 9.

The magnetic geared motor 10B has a structure in which the magnetic gear and a motor are integrated. The magnetic geared motor 10B rotates the rotor (high-speed rotor) 40 by a rotating magnetic field generated by energization of the stator winding 24. Power transmission from the rotor 40 to the magnetic pole piece rotor (low-speed rotor) 30 utilizes the principle of a harmonic magnetic gear.

During operation of the magnetic geared motor 10B, the axial leakage magnetic flux Lf can occur in the magnetic pole piece 32, as in the magnetic geared generator 10A. In this case, an eddy current can be generated in the in-plane direction in each magnetic pole piece 32. Relatively large eddy currents can be generated in the electrical steel sheets 35 disposed in, for example, the axial both end portions of the magnetic pole piece 32.

(Internal Structure of Magnetic Geared Rotating Machine)

Subsequently, an internal structure of the above-described magnetic geared rotating machine 10 (10A, 10B) will be described with reference to FIG. 2.

Figure 2:
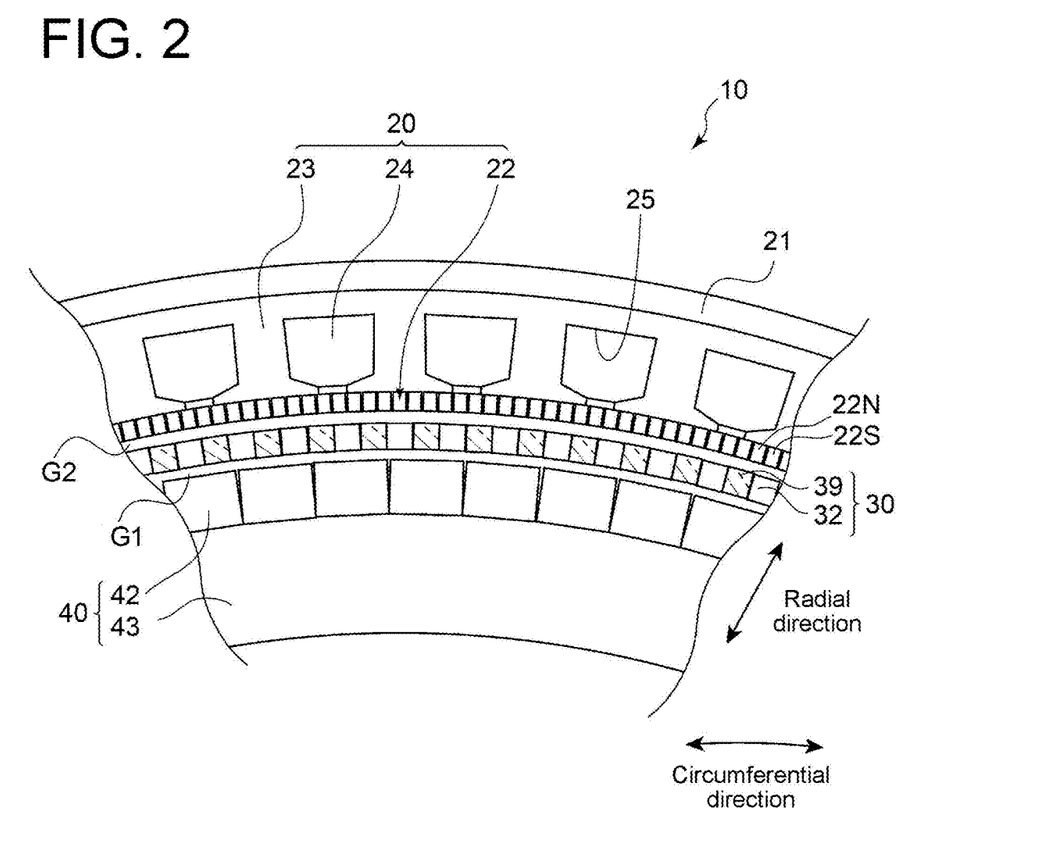
FIG. 2 is a radial cross-sectional view of the magnetic geared rotating machine according to an embodiment.

FIG. 2 is a radial cross-sectional view of the magnetic geared rotating machine 10 according to an embodiment. In FIG. 2, only some components of the magnetic geared rotating machine 10 are hatched for the sake of illustrative convenience. In FIG. 2, the "circumferential direction" is the circumferential direction based on the already-described "axial direction" (see FIG. 1A, 1B).

As shown in FIG. 2, the stator 20 of the magnetic geared rotating machine 10 includes the plurality of stator magnets 22 and stator windings 24 arranged so as to be aligned in the circumferential direction. The stator magnets 22 and the stator windings 24 are attached to a stator core 23.

The stator magnets 22 are composed of permanent magnets, and the plurality of stator magnets 22 are disposed in the circumferential direction so as to axially pass between the stator windings 24 and the magnetic pole piece rotor 30 in the radial direction. The plurality of stator magnets 22 of the present example are composed of a plurality of stator magnets 22N, 22S alternately arranged in the circumferential direction and having different magnetic poles. In the example shown in FIG. 2, each of the stator magnets 22 is an axially elongated rod-shaped member having a rectangular cross section.

FIG. 2 shows the stator 20 having a surface permanent magnet (SPM) structure in which the stator magnets 22 are attached to the surface of the stator core 23. In another embodiment, the stator 20 may have an interior permanent magnet (IPM) structure in which the stator magnets 22 are embedded in the stator core 23.

The stator windings 24 are disposed within a plurality of slots 25 disposed in the stator core 23. The plurality of slots 25 are disposed in the circumferential direction, and each of the slots 25 extends in the axial direction. Axial both ends of each of the slots 25 are open, and coil ends of the stator winding 24 that do not fit into the slot 25 may protrude from the stator core 23 at axial both ends of the stator core 23.

The rotor 40 which is disposed at a position radially displaced from the stator 20 of the above-described configuration includes the plurality of rotor magnets 42 arranged so as to be aligned in the circumferential direction. The plurality of rotor magnets 42 are a plurality of permanent magnets alternately arranged in the circumferential direction and having different magnetic poles. The number of magnetic poles of the plurality of rotor magnets 42 is less than the number of magnetic poles of the plurality of stator magnets 22. Each of the rotor magnets 42 may be an elongated rod member having a rectangular cross section.

FIG. 2 shows the rotor 40 having a surface permanent magnet (SPM) structure in which the rotor magnets 42 are attached to the surface of the rotor core 43. In another embodiment, the rotor 40 may have an interior permanent magnet (IPM) structure in which the rotor magnets 42 are embedded in the rotor core 43.

Besides the rotor magnet 42 and the rotor core 43, the rotor 40 may include the end plate 44 described above with reference to FIGS. 1A and 1B. The end plate 44 is an annular plate extending along the radial direction from a mounting position of the bearing B2 toward the rotor core 43.

The magnetic pole piece rotor 30 disposed at a radial position between the stator 20 and the rotor 40 configured as described above includes the plurality of magnetic pole pieces 32 arranged so as to be aligned in the circumferential direction and at least one non-magnetic holder 39 for holding the plurality of magnetic pole pieces 32. Each of the magnetic pole pieces 32 includes the already-described plurality of axially laminated electrical steel sheets 35 (see FIG. 1A, 1B). The non-magnetic holder 39 is formed by, for example, a resin material.

In the embodiment illustrated in FIG. 2, the plurality of non-magnetic holders 39 and the plurality of magnetic pole pieces 32 are arranged alternately with each other in the circumferential direction. Each of the magnetic pole pieces 32 is opposed to the rotor 40 with a first air gap G1 therebetween, and each of the magnetic pole pieces 32 is opposed to the stator 20 with a second air gap G2 therebetween.

Figure 4A:
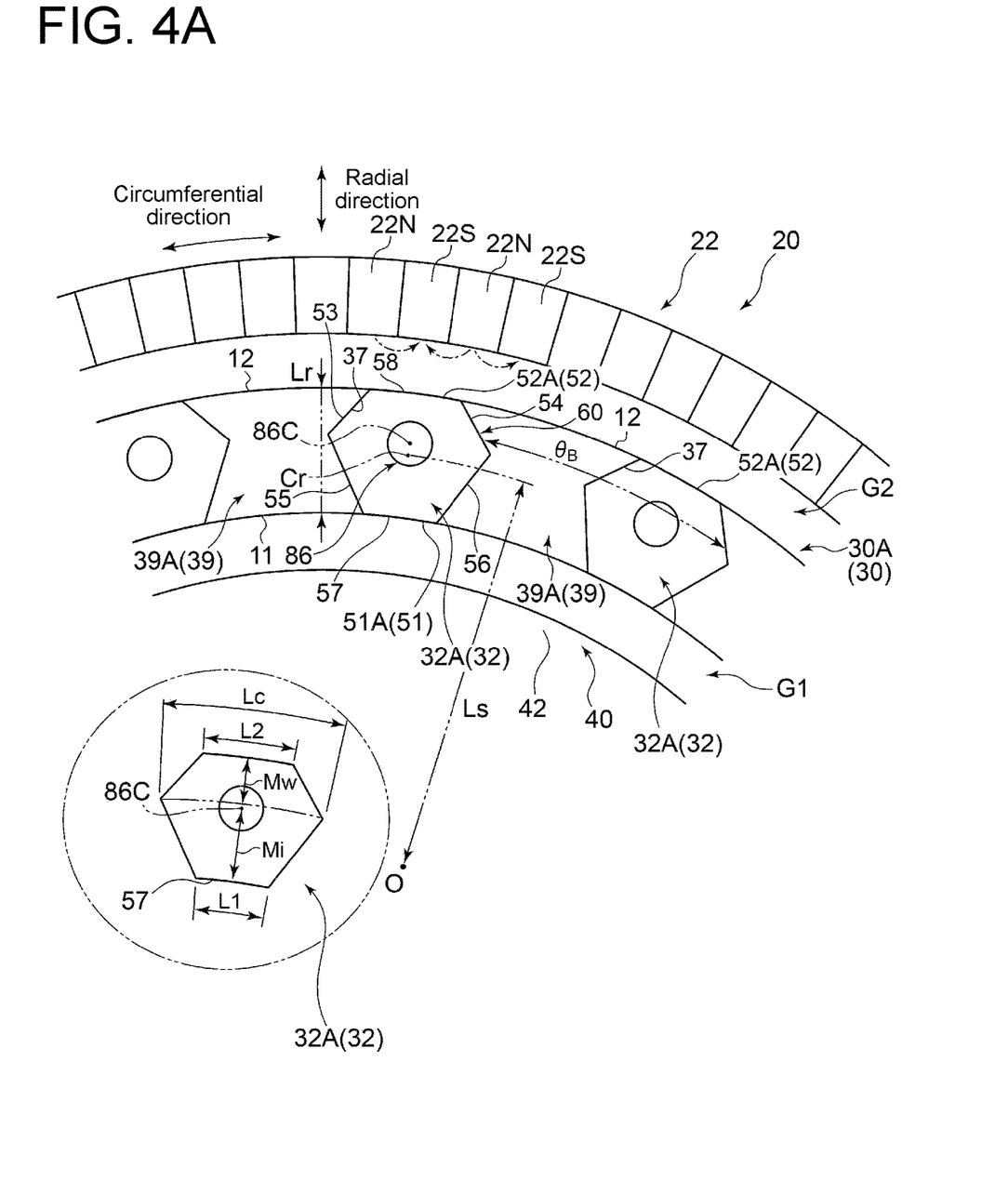
FIG. 4A is a radial cross-sectional view of a magnetic pole piece rotor according to an embodiment.
Figure 4B:
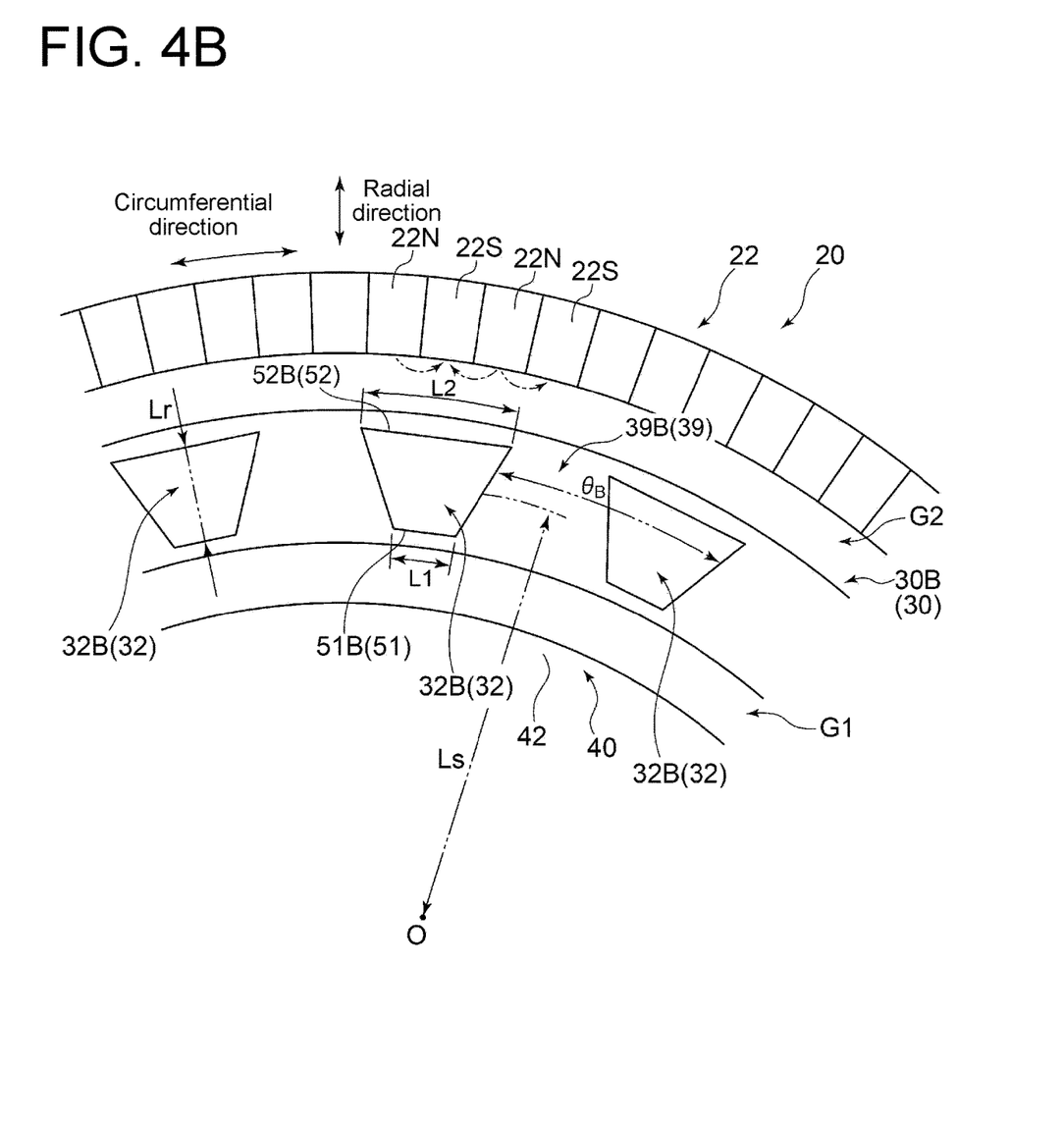
FIG. 4B is a radial cross-sectional view of a magnetic pole piece rotor according to another embodiment.

In another embodiment, the non-magnetic holder 39 may hold the plurality of magnetic pole pieces 32 (see FIG. 4B). In this case, the non-magnetic holder 39 may extend in the circumferential direction. As a more specific example, inside each of a plurality of openings disposed in the non-magnetic holder 39, the plurality of magnetic pole pieces 32 may extend in the axial direction and an outer surface of each of the magnetic pole pieces 32 may be covered with the non-magnetic holder 39. One non-magnetic holders 39 may extend in the circumferential direction. In this case, the one non-magnetic holder 39 extends continuously in the circumferential direction over the entire circumference of the magnetic pole piece rotor 30. Alternatively, the plurality of non-magnetic holders 39 may extend in the circumferential direction. In this case, the plurality of non-magnetic holders 39 may respectively hold the plurality of magnetic pole pieces 32, and the plurality of non-magnetic holders 39 may form an annular shape as viewed in the axial direction. In either embodiment, each of the magnetic pole pieces 32 is arranged inside the opening of the non-magnetic holder 39. Therefore, the magnetic pole piece 32 is opposed to the rotor 40 with the first air gap G1 and a part of the non-magnetic holder 39 therebetween, and the magnetic pole piece 32 is opposed to the stator 20 with the second air gap G2 and another part of the non-magnetic holder 39 therebetween.

Figure 3:
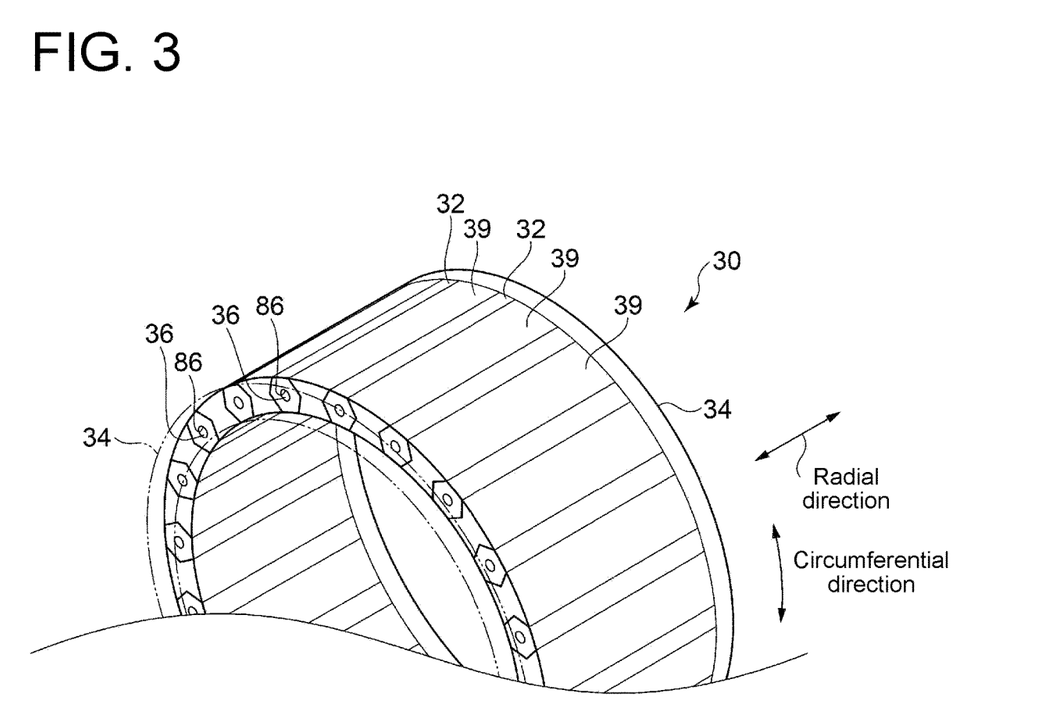
FIG. 3 is a perspective view of a magnetic pole piece rotor according to an embodiment.

Next, details of the further configuration of the magnetic pole piece rotor 30 will be described with reference to FIG. 3. FIG. 3 is a perspective view of the magnetic pole piece rotor 30 according to an embodiment. In the embodiment illustrated in FIG. 3, the plurality of magnetic pole pieces 32 and the plurality of non-magnetic holders 39 are arranged alternately with each other in the circumferential direction.

As shown in FIG. 3, a plurality of connecting bars 36 which are components of the magnetic pole piece rotor 30 extend in the axial direction inside an axial holes 86 disposed so as to penetrate the magnetic pole pieces 32 in the axial direction. The connecting bars 36 are formed by, for example, a non-magnetic material such as titanium or stainless steel. Further, the plurality of connecting bars 36 are held by a pair of end rings 34. The pair of end rings 34 respectively located on axial both sides with respect to the plurality of magnetic pole pieces 32 and the plurality of non-magnetic holders 39. FIG. 3 virtually illustrates one of the pair of end rings 34 by double-dotted chain lines.

Since the plurality of connecting bars 36 are arranged, the magnetic pole piece rotor 30 can form an assembly of the plurality of magnetic pole pieces 32. Further, since the plurality of connecting bars 36 extend in the axial direction inside the plurality of axial holes 86 respectively, it is possible to prevent the magnetic pole pieces 32 from shifting radially outward by centrifugal force when the magnetic pole piece rotor 30 rotates.

In another embodiment, the magnetic pole piece rotor 30 may not include the plurality of connecting bars 36. In this case, the axial holes 86 may not be formed in the magnetic pole pieces 32. Even in such an embodiment, the magnetic pole piece rotor 30 can form the assembly of the plurality of magnetic pole pieces 32.

Further, the shape of the magnetic pole piece 32 as viewed in the axial direction illustrated in FIG. 3 is, as an example, a hexagonal shape. In another embodiment, the shape of the magnetic pole piece 32 as viewed in the axial direction may be, for example, a polygonal shape such as a quadrilateral shape or an octagonal shape. The shape of the non-magnetic holder 39 as viewed in the axial direction may also be changed according to the shape of the magnetic pole piece 32 as viewed in the axial direction.

Details of the further configurations of the magnetic pole piece 32 and the non-magnetic holder 39 will be described with reference to FIG. 4A, 4B. FIG. 4A, 4B is a radial cross-sectional view of a magnetic pole piece rotor 30A, 30B (30) according to an embodiment. In FIG. 4A, 4B, the illustrated components are not hatched for the sake of illustrative convenience.

As shown in FIG. 4A, 4B, the magnetic pole piece 32A, 32B (32) includes a first face 51A, 51B (51) opposed to the rotor magnet 42 in the radial direction and a second face 52A, 52B (52) opposed to the stator magnet 22 in the radial direction. In an embodiment, a length of the second face 52 in the circumferential direction (hereinafter, also referred to as a second circumferential length) is longer than a length of the first face 51 in the circumferential direction (hereinafter, also referred to as a first circumferential length). The first circumferential length corresponds to a dimension L1 and the second circumferential length corresponds to a dimension L2. Since the second circumferential length is longer than the first circumferential length, stator magnet losses in the stator magnet 22 can be reduced (details will be described later).

In the magnetic pole piece 32A, 32B (32), a relation between the first circumferential length (dimension L1) and the second circumferential length (dimension L2) may be defined by Expression (3).

$$0.25L2 < L1 < 0.75L2 \quad \text{Expression (3)}$$

Since L1 is greater than 0.25L2, a magnetic path of a magnetic flux generated from the rotor magnet 42 and flowing in the radial direction is secured in the magnetic pole piece. Further, since 0.75L2 is greater than L1, the second circumferential length can sufficiently be elongated.

Further, as illustrated in FIG. 4A, 4B, the circumferential length of the magnetic pole piece 32A, 32B (32) varies according to a radial position. In order to obtain an average value of the circumferential length, an area (referred to as S) of a region surrounded by an outer contour 60 of the magnetic pole piece 32 in a radial cross section of the magnetic pole piece 32 can be divided by a radial length (dimension Lr) of the magnetic pole piece 32. In an embodiment where the outer contour 60 is internally provided with a hole (for example, the axial hole 86) penetrating the magnetic pole piece 32 in the axial direction (see FIG. 4A), the area of the hole is also included in the above-described area (S). The same also applies to a case where the hole opens on one end face in the radial direction or one end face in the circumferential direction of the magnetic pole piece 32.

An angle ($\theta_A$) obtained by dividing an average value (=S/Lr) of the circumferential length by a length (dimension Ls) from a rotation center O of the magnetic pole piece 32 to a radial midpoint Cr of the magnetic pole piece 32 can be treated as a value that correlates with the average value of the circumferential length of the magnetic pole piece 32. In summary, $\theta_A$ is defined by Expression (4) below. Hereinafter, $\theta_A$ may be referred to as the magnetic pole piece average angle.

$$\theta_A = S/(Lr \times Ls) \quad \text{Expression (4)}$$

As can be seen from Expression (4), the magnetic pole piece average angle ($\theta_A$) is a value obtained by dividing the area (S) of the region surrounded by the outer contour 60 in the radial cross section of the magnetic pole piece 32 by the radial length (Lr) of the magnetic pole piece and the length (Lr) from the rotation center O to the radial midpoint of the magnetic pole piece 32.

Further, an angle defined, in regard to each of the two magnetic pole pieces 32 adjacent in the circumferential direction, as a positive difference value of an angular position of each of the two magnetic pole pieces 32 with respect to the rotation center O is set as $\theta_B$ (dimension $\theta_B$). Hereinafter, $\theta_B$ may be referred to as the differential angle.

In the magnetic pole piece 32A, 32B, the relation between the magnetic pole piece average angle ($\theta_A$) and the differential angle ($\theta_B$) may be defined by Expression (1).

$$\theta_A \leq 0.67\theta_B \quad \text{Expression (1)}$$

Further, the relation between the magnetic pole piece average angle ($\theta_A$) and the differential angle ($\theta_B$) may be defined by Expression (2).

$$\theta_A \geq 0.54\theta_B \quad \text{Expression (2)}$$

As will be described later, a high pull out torque of the magnetic geared rotating machine 10 is realized by satisfying at least either of Expression (1) and Expression (2). Further, instead of satisfying Expression (2), Expression (5) may be satisfied.

$$\theta_A \geq 0.40\theta_B \quad \text{Expression (5)}$$

In another embodiment where the magnetic geared motor 10B is adopted as the magnetic geared rotating machine 10, instead of satisfying Expression (2) or Expression (5), Expression (6) may satisfied.

$$\theta_A > 0.20\theta_B \quad \text{Expression (6)}$$

As will be described later, if $\theta_A$ is not greater than $0.20\theta_B$, a load torque of the magnetic geared rotating machine 10 exceeds a Max. pull out torque, Expression (6) needs to be satisfied in order to avoid step-out of the magnetic geared rotating machine 10.

As shown in FIG. 4A, the magnetic pole piece rotor 30A (30) includes the plurality of non-magnetic holders 39A (39) for sandwiching each of the plurality of magnetic pole pieces 32A (32) therebetween in the circumferential direction.

Each of the non-magnetic holders 39A (39) includes a holder surface 37 extending in a direction approaching a circumferential midpoint of the non-magnetic holder 39 as the holder surface 37 goes inward in the radial direction, and the magnetic pole piece 32A (32) may include a third face 53 opposed to and in contact with the holder surface 37. Since the holder surface 37 is inclined as described above with respect to the radial direction and the third face 53 is opposed to and in contact with the holder surface 37, it is possible to prevent the magnetic pole piece 32 from coming off the non-magnetic holder 39A by centrifugal force when the magnetic pole piece rotor 30 rotates.

Further, the non-magnetic holder 39A (39) may include a fourth face 54 located opposite to the third face in the circumferential direction. The fourth face 54 is opposed to and in contact with another non-magnetic holder 39A. The fourth face 54 may extend so as to approach a circumferential midpoint of the another non-magnetic holder 39A as the fourth face 54 goes inward in the radial direction. Since the fourth face 54 thus inclined with respect to the radial direction is opposed to and in contact with the another non-magnetic holder 39, it is possible to further prevent the magnetic pole piece 32 from coming off the non-magnetic holder 39A by centrifugal force when the magnetic pole piece rotor 30 rotates.

A circumferential length (dimension Lc) from the third face 53 to the fourth face 54 is longer than the second circumferential length (dimension L2). Whereby, the size of the magnetic pole piece 32A on the stator 20 side is secured. Therefore, the magnetic path of the magnetic flux formed inside the magnetic pole piece 32A is easily arranged. Further, in the embodiment where the magnetic geared rotating machine 10 is the magnetic geared motor 10B, the magnetic path of the magnetic flux generated from the stator magnet 22 and flowing in the circumferential direction is appropriately modulated in the magnetic pole piece 32A by the above-described dimensional relation, making it possible to suppress a decrease in output torque of the magnetic geared motor 10B. The dimension Lc according to an embodiment is the maximum circumferential length from the third face 53 to the fourth face 54.

In another embodiment, the fourth face 54 may extend parallel to the radial direction. In this case, the fourth face 54 is connected to each of the first face 51 and the second face 52.

As shown in FIG. 4A, the non-magnetic holder 39A (39) may include a fifth face 55 connected to the third face 53 and a sixth face 56 connected to the fourth face 54. The sixth face 56 is located opposite to the fifth face 55 in the circumferential direction. Both the fifth face 55 and the sixth face 56 extend in a direction away from the circumferential midpoint of the magnetic pole piece 32A as the fifth face 55 and the sixth face 56 go inward in the radial direction. In another embodiment, at least either of the fifth face 55 or the sixth face 56 may extend parallel to the radial direction.

Of the magnetic pole piece 32A, a corner formed at a connection position between the third face 53 and the fifth face 55 and a corner formed at a connection position between the fourth face 54 and the sixth face 56 are both sharp. In another embodiment, at least either of the two corners may be rounded.

As shown in FIG. 4A, the non-magnetic holder 39A (39) may have a first holder circumference 11 radially opposed to the rotor 40 with the first air gap G1 therebetween, and a second holder circumference 12 radially opposed to the stator 20 with the second air gap G2 therebetween. The first holder circumference 11 is an end face of the non-magnetic holder 39A on one side in the radial direction. The second holder circumference 12 is an end face of the non-magnetic holder 39A located opposite to the first holder circumference 11.

In the embodiment illustrated in FIG. 4A, the first holder circumference 11 is an inner circumferential surface of the non-magnetic holder 39A, and the second holder circumference 12 is an outer circumferential surface of the non-magnetic holder 39A.

In another embodiment adopting the already-described structure where the rotor 40, the magnetic pole piece rotor 30, and the stator 20 are arranged in order from the radially outer side, the first holder circumference 11 is the outer circumferential surface of the non-magnetic holder 39A, and the second holder circumference 12 is the inner circumferential surface of the non-magnetic holder 39A.

As shown in FIG. 4A, the magnetic pole piece 32A (32) may include the above-described axial hole 86. In this case, a radial position of a center 86C of the axial hole 86 is closer to the second face 52A (52) than the radial midpoint Cr of the magnetic pole piece 32A (32).

Since the second circumferential length is longer than the first circumferential length, more magnetic pole pieces 32 tend to be arranged at positions close to the stator magnet 22. In this regard, since the radial position of the center 86C of the axial hole 86 is closer to the second face 52A than the radial midpoint Cr of the magnetic pole piece 32A (32), the amount of the magnetic pole piece 32 located close to the stator magnet 22 is reduced. Consequently, the arrangement amount of the magnetic pole piece 32A is equalized between the rotor magnet 42 side and the stator magnet 22 side with respect to the radial midpoint Cr of the magnetic pole piece 32A.

Further, in the embodiment where the axial hole 86 is provided, if the circumferential length (dimension Lc) from the third face 53 to the fourth face 54 is longer than the second circumferential length (dimension L2), the magnetic path of the magnetic flux passing through the magnetic pole piece 32A is prevented from narrowing in the circumferential direction near the axial hole 86. Whereby, in the embodiment where the magnetic geared rotating machine 10 is the magnetic geared motor 10B, the magnetic path of the magnetic flux generated from the stator magnet 22 and flowing in the circumferential direction is appropriately modulated in the magnetic pole piece 32A, making it possible to suppress the decrease in output torque.

Further, a radial length from an inner side face 57, which is a face of the first face 51A or the second face 52A located on the radially inner side, to the center 86C of the axial hole 86 corresponds to a dimension Mi. A maximum radial length from an outer side face 58, which is a face of the first face 51A or the second face 52A located opposite to the inner side face 57, to the third face 53 corresponds to a dimension Mw. In the embodiment illustrated in FIG. 4A, the inner side face 57 is the first face 51A and the outer side face 58 is the second face 52B. The dimension Mi is longer than the dimension Mw. Since the circumferential length (dimension Lc) from the third face 53 to the fourth face 54 is longer than the second circumferential length (dimension L2) as described above, more magnetic pole pieces 32 tend to be arranged between the third face 53 and the fourth face 54. In this regard, since the dimension Mi is longer than the dimension Mw, the radial position of the axial hole 86 is arranged near the region between third face 53 and fourth face 54. Consequently, the amount of the magnetic pole piece 32 between the third face 53 and the fourth face 54 is reduced. Therefore, the arrangement amount of the magnetic pole piece 32A is equalized between the rotor magnet 42 side and the stator magnet 22 side with respect to the radial midpoint Cr of the magnetic pole piece 32. Therefore, the magnetic path formed inside the magnetic pole piece 32A is easily arranged.

In the another embodiment adopting the already-described structure where the rotor 40, the magnetic pole piece rotor 30, and the stator 20 are arranged in order from the radially outer side, the inner side face 57 is the second face 52A and the outer side face 58 is the first face 51A. Also in this embodiment, the radial length from the inner side face 57 to the center 86C of the axial hole 86 may be longer than the maximum radial length from the outer side face 58 to the third face 53.

As shown in FIG. 4A, the first face 51A (51) may be arranged at the same radial position as the first holder circumference 11 of the non-magnetic holder 39A (39), and the second face 52A (52) may be arranged at the same radial position as the second holder circumference 12. Even if the first face 51A and the first holder circumference 11 are displaced from each other in the radial direction due to, for example, a manufacturing error, the first face 51A and the first holder circumference 11 are arranged at substantially the same radial position. The same also applies to a case where the second face 52A and the second holder circumference 12 are displaced from each other in the radial direction due to, for example, a manufacturing error.

Further, the first face 51A (51) may be exposed to the rotor 40 side, and the second face 52A (52) may be exposed to the stator 20 side. As a more specific example, the first face 51 may be opposed to the rotor magnet 42 with the first air gap G1 therebetween, and the second face 52 may be opposed to the stator magnet 22 with the second air gap G2 therebetween. Since both the first face 51 and the second face 52 are exposed, the magnetic flux modulation effect by the magnetic pole piece 32 can be increased.

In another embodiment, the magnetic pole piece 32A and the non-magnetic holder 39A may be covered with another component. In this case, at least either of the first face 51A or the second face 52A may not be exposed, and likewise, at least either of the first holder circumference 11 or the second holder circumference 12 may not be exposed. For example, both the second face 52A and the second holder circumference 12 may be opposed to the stator 20 with the another component and the second air gap G2 therebetween.

As shown in FIG. 4B, the magnetic pole piece rotor 30B (30) includes the single non-magnetic holder 39B (39) for holding the plurality of magnetic pole pieces 32B (32). The non-magnetic holder 39B extends in the circumferential direction.

In this case, the first face 51B (51) and the second face 52B (52) are covered with the single non-magnetic holder 39B (39). As a more specific example, the first face 51B is opposed to the rotor magnet 42 with the non-magnetic holder 39 and the first air gap G1 therebetween, and the second face 52B (52) is opposed to the rotor magnet 42 with the non-magnetic holder 39 and the second air gap G2 therebetween.

As shown in FIG. 4B, the shape of each of the magnetic pole pieces 32B as viewed in the axial direction is a trapezoidal shape.

In another embodiment, each of the magnetic pole pieces 32B (32) is provided with the axial hole 86 (see FIG. 4A), and the connecting bar 36 may extend in the axial direction inside the axial hole 86.

The relationships between the shape of the magnetic pole piece 32, and pole piece iron losses in the magnetic pole piece 32 and the stator magnet losses in the stator magnet 22 will be described with reference to FIGS. 5 and 6.

Figure 5:
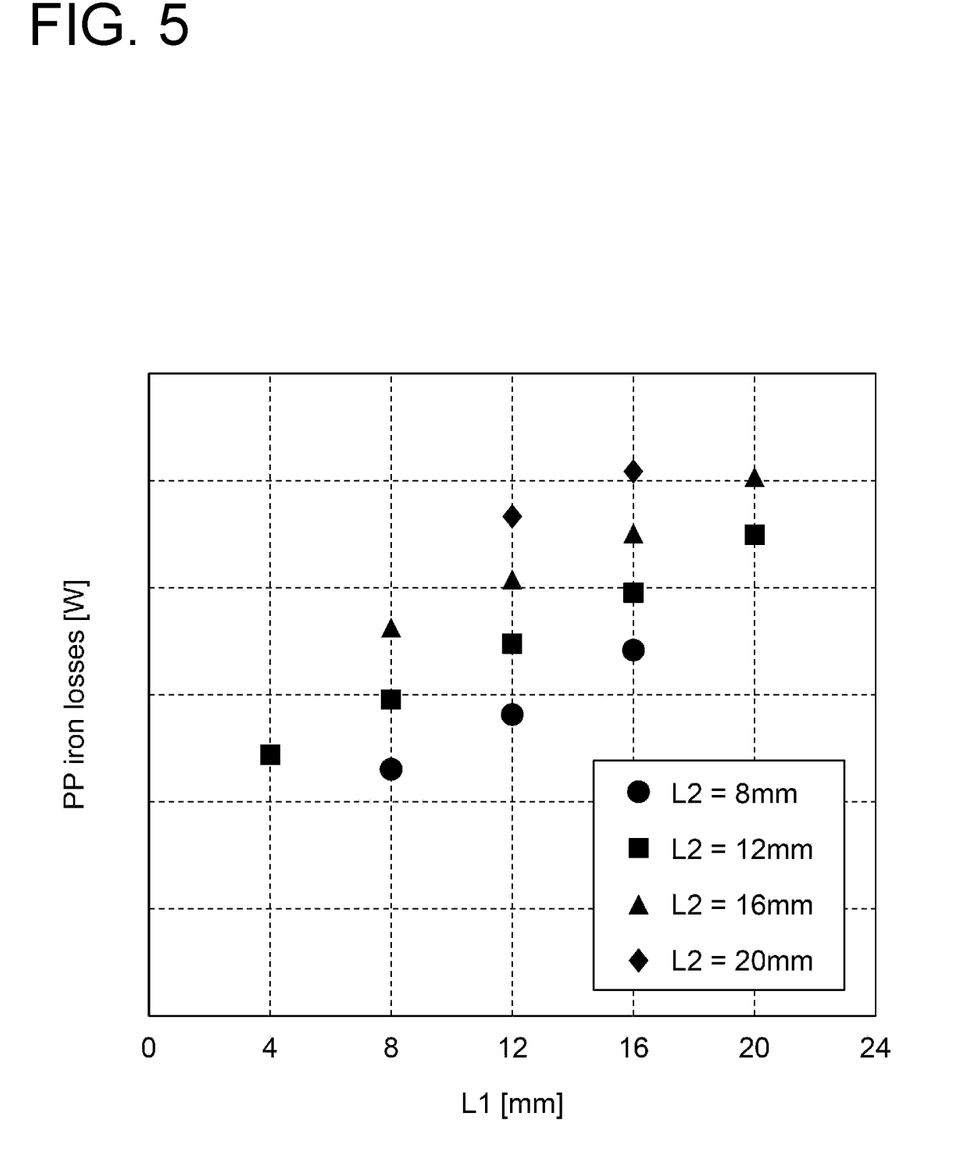
FIG. 5 is a graph showing pole piece iron losses in the magnetic pole piece 32 depending on a first circumferential length and a second circumferential length according to an embodiment.

FIG. 5 is a graph showing the pole piece iron losses in the magnetic pole piece 32 depending on the first circumferential length and the second circumferential length according to an embodiment. The pole piece iron losses in the magnetic pole piece 32 include hysteresis losses and eddy current losses in the magnetic pole piece 32. "PP" shown in FIG. 5 means pole piece.

Figure 6:
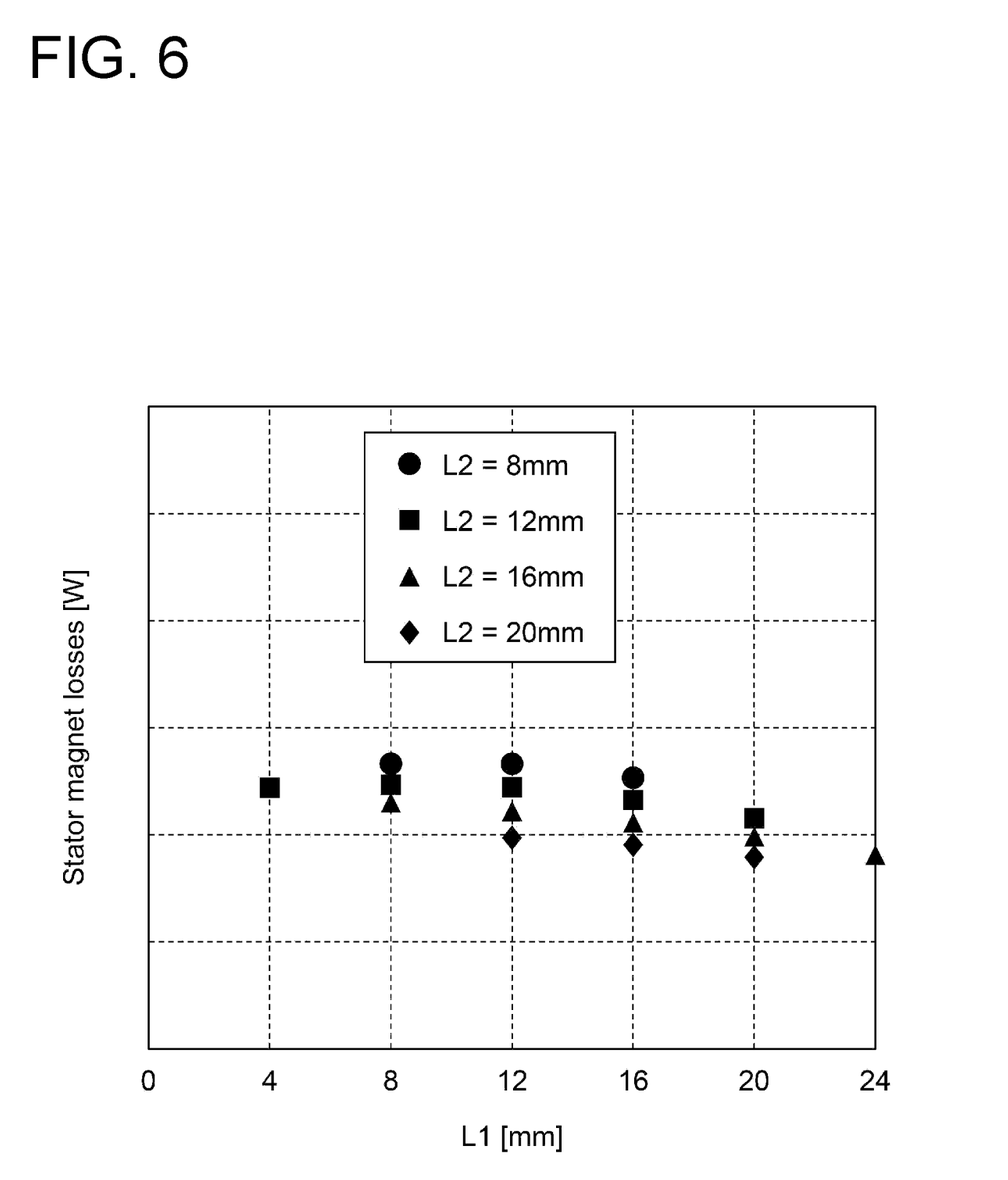
FIG. 6 is a graph showing stator magnet losses in a stator magnet depending on the first circumferential length and the second circumferential length according to an embodiment.

FIG. 6 is a graph showing the stator magnet losses in the stator magnet 22 depending on the first circumferential length and the second circumferential length according to an embodiment. The stator magnet losses in the stator magnet 22 include eddy current losses.

As an example, FIGS. 5 and 6 are simulation data when the magnetic pole piece rotor 30B (see FIG. 4B) is applied to the magnetic geared motor 10B (see FIG. 1B). In the graphs of FIGS. 5 and 6, the horizontal axis indicates the first circumferential length (dimension L1) and the simulation data are plotted depending on the second circumferential length (dimension L2). Further, the amount of loss per scale in the vertical direction of the graph is the same between FIGS. 5 and 6.

As shown in FIG. 5, it can be seen that the shorter each of the first circumferential length and the second circumferential length is, the less the pole piece iron losses in the magnetic pole piece 32B are. It is presumed that this is because the magnetic pole piece 32B itself to be passed through by the magnetic flux is decreased in size, thereby reducing the leakage magnetic flux Lf (see FIG. 1A, 1B) and reducing the eddy current flowing through the electrical steel sheet 35.

As shown in FIG. 6, it can be seen that the length of the first circumferential length has little impact on the stator magnet losses in the stator magnet 22. On the other hand, it was found that the longer the second circumferential length, the less the stator magnet losses in the stator magnet 22. It is presumed that this is because the longer the second circumferential length, the longer the time the specific magnetic pole piece 32B is opposed to the specific stator magnet 22 during the rotation of the magnetic pole piece rotor 30, thereby suppressing the amount of change per unit time in the magnetic flux passing through the stator magnet 22.

Based on the reasons presumed above, it is understood that the magnetic geared motor 10B provided with the magnetic pole piece rotor 30A (see FIG. 4A) instead of the magnetic pole piece rotor 30B also yields the results similar to those of FIGS. 5 and 6. Further, in light of the fact that the magnetic geared generator 10A and the magnetic geared motor 10B adopt the common configuration, it is understood that the magnetic geared generator 10A (see FIG. 1A) provided with the magnetic pole piece rotor 30B also yields the results similar to those of FIGS. 5 and 6.

As can be seen from the results of FIGS. 5 and 6, the increasing/decreasing tendency of the pole piece iron losses in the magnetic pole piece 32 and the increasing/decreasing tendency of the stator magnet losses in the stator magnet 22 are opposite to each other depending on the length of the second circumferential length. That is, the longer the second circumferential length, the greater the pole piece iron losses in the magnetic pole pieces 32 and the less the stator magnet losses in the stator magnet 22. On the other hand, it was found that the longer the second circumferential length, the less the pole piece iron losses in the magnetic pole pieces 32 and the greater the stator magnet losses in the stator magnet 22.

In order to realize efficient operation of the magnetic geared rotating machine 10, the present inventors consider it is preferable to elongate the second circumferential length by giving more importance to the stator magnet losses in the stator magnet 22 than to the pole piece iron losses in the magnetic pole piece 32. This is because the stator 20 including the stator magnet 22 is provided with the stator winding 24 and the temperature of the stator magnet 22 tends to rise easily as the stator winding 24 is energized. If the temperature of the stator magnet 22 rises, the stator magnet 22 is demagnetized and the rotation of the magnetic pole piece rotor 30 is inhibited (for example, the output torque is reduced in the magnetic geared motor 10B).

Particularly in an embodiment where the stator magnet 22 is a rare earth magnet, the demagnetization of the stator magnet 22 is significantly great, compared to an embodiment where the stator magnet 22 is, for example, a neodymium magnet. In this regard, the stator magnet losses in the stator magnet 22 are suppressed since the second circumferential length is long, resulting in suppression of the temperature rise of the stator magnet 22. Whereby, a decrease in efficiency during operation of the magnetic geared rotating machine 10 is suppressed.

The relationship between the shape of the magnetic pole piece rotor 30 and the torque in the magnetic geared rotating machine 10 will be described with reference to FIG. 7.

Figure 7:
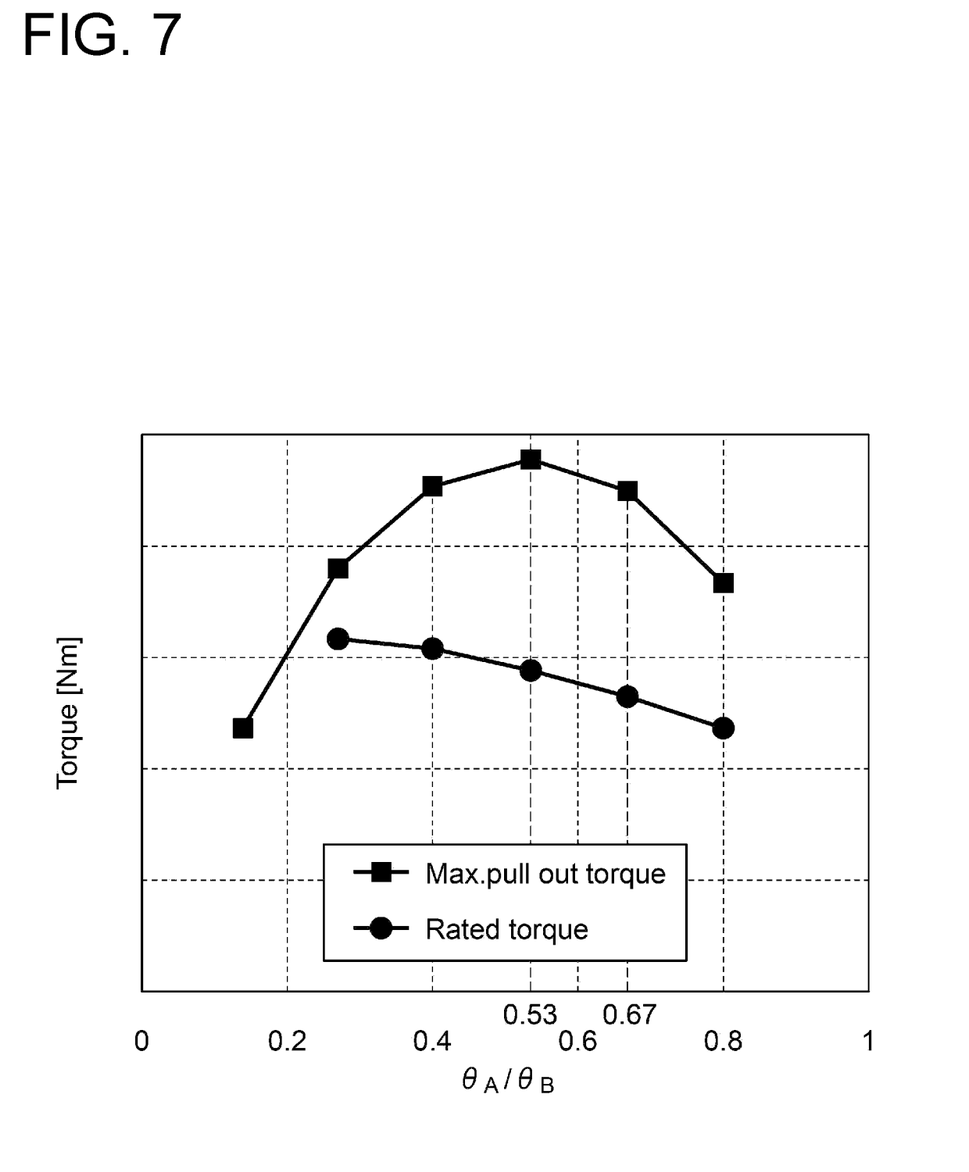
FIG. 7 is a graph showing a torque of the magnetic geared rotating machine depending on a shape of the magnetic pole piece rotor according to an embodiment.

FIG. 7 is a graph showing the torque of the magnetic geared rotating machine 10 depending on the shape of the magnetic pole piece rotor 30 according to an embodiment. As an example, the graph shows simulation data when the magnetic pole piece rotor 30B (see FIG. 4B) is applied to the magnetic geared motor 10B (FIG. 1B).

FIG. 7 is the graph showing the relationship between a ratio ($\theta_A/\theta_B$) of the magnetic pole piece average angle ($\theta_A$) to the differential angle ($\theta_B$), and a max. pull out torque and a rated torque of the magnetic geared motor 10B. The max. pull out torque is a maximum value of a magnetic torque pulled out from the rotor 40 to the magnetic pole piece 32 of the magnetic geared motor 10B. The rated torque is the output torque required when the magnetic geared rotating machine 10 performs rated operation. If this rated torque exceeds the max. pull out torque, a load torque in the magnetic geared motor 10B exceeds the max. pull out torque, causing step-out.

As can be seen from FIG. 7, it was found that a high level of max. pull out torque is achieved if $\theta_A/\theta_B$ is at most 0.67. Therefore, it is understood that the high level of pull out torque is ensured in the magnetic geared motor 10B if the above-described Expression (1) holds.

Further, it was found that if $\theta_A/\theta_B$ is at least 0.4, the max. pull out torque is achieved which is equal to or greater than the max. pull out torque when $\theta_A/\theta_B$ is 0.67. Therefore, it is understood that the high level of pull out torque is ensured in the magnetic geared motor 10B if the above-described Expression (5) holds.

Further, it was found that the max. pull out torque is maximum if $\theta_A/\theta_B$ is 0.53. Therefore, it is understood that the pull out torque of the magnetic geared motor 10B is achieved in a high level if the above-described Expression (2) holds.

It is expected that similar data is obtained also when, instead of the magnetic pole piece rotor 30B, the magnetic pole piece rotor 30A is applied to the magnetic geared motor 10B. This is because the level of the output torque of the magnetic geared motor 10B is mainly determined by how much the magnetic flux generated from the plurality of stator magnets 22 flows through a portion of the magnetic pole piece 32 on the stator 20 side. That is, it is understood that data similar to that of FIG. 7 is acquired also in the magnetic pole piece rotor 30A provided with the axial hole 86 into which the connecting bar 36 is inserted.

Further, it is expected that the magnetic geared generator 10A having the configuration in common with the magnetic geared motor 10B also yields the result similar to that of FIG. 7.

It is predicted from the graph of FIG. 7 that the max. pull out torque falls below the rated torque if $\theta_A/\theta_B$ is at most 0.2. Therefore, in order for the magnetic geared rotating machine 10 to operate without step-out, it is a prerequisite that the above-described Expression (3) holds.

(Conclusion)

Hereinafter, the overview of the magnetic geared rotating machine 10 and the power generation system 1 using the same according to some embodiments will be described.

(1) A magnetic geared rotating machine (10) according to at least one embodiment of the present disclosure, includes: a stator (20) which includes a plurality of stator magnets (22) arranged so as to be aligned in a circumferential direction; a rotor (40) which includes a plurality of rotor magnets (42) arranged so as to be aligned in the circumferential direction, and in which the number of magnetic poles of the plurality of rotor magnets (42) is less than the number of magnetic poles of the plurality of stator magnets (22); and a magnetic pole piece rotor (30) which includes a plurality of magnetic pole pieces (32) arranged so as to be aligned in the circumferential direction. Each of the magnetic pole pieces (32) has: a first face (51) opposed to the rotor (40) in a radial direction; and a second face (52) opposed to the stator (20) in the radial direction and having a circumferential length (dimension L2) longer than a circumferential length (dimension L1) of the first face (51).

With the above configuration (1), the second circumferential length (dimension L2) which is the circumferential length of the second face (52) is longer than the first circumferential length (dimension L1) which is the circumferential length of the first face (51). Whereby, the amount of change per unit time in the magnetic flux passing through the stator magnet (22) is suppressed which is due to the rotation of the magnetic pole piece rotor (30). Therefore, the magnetic geared rotating machine (10) is implemented which is capable of reducing stator magnet losses in the stator magnet (22).

(2) In some embodiments, in the above configuration (1), the magnetic pole piece rotor (30) includes a plurality of non-magnetic holders (39) arranged in the circumferential direction alternately with the plurality of magnetic pole pieces (32), each of the non-magnetic holders (39) includes a holder surface (37) extending in a direction approaching a circumferential midpoint of the non-magnetic holder (39) as the holder surface (37) goes inward in the radial direction, each of the magnetic pole pieces (32) has: a third face (53) opposed to and in contact with the holder surface (37); and a fourth face (54) located opposite to the third face (53) in the circumferential direction, and a length (dimension Lc) in the circumferential direction from the third face (53) to the fourth face (54) is longer than the circumferential length (dimension L2) of the second face (52).

With the above configuration (2), since the third face (53) of the magnetic pole piece (32) is opposed to and in contact with the holder surface (37) of the non-magnetic holder (39), it is possible to prevent the magnetic pole piece (32) from coming off the magnetic pole piece rotor (30) by centrifugal force when the magnetic pole piece rotor (30) rotates. Further, since the length (dimension Lc) in the circumferential direction from the third face (53) to the fourth face (54) is longer than the circumferential length (dimension L2) of the second face (52), the size of the magnetic pole piece (32) on the stator magnet (22) side is secured. Therefore, the magnetic path of the magnetic flux formed inside the magnetic pole piece (32) is easily arranged. Further, in the embodiment where the magnetic geared rotating machine (10) is the magnetic geared motor (10B), since the length (dimension Lc) in the circumferential direction from the third face (53) to the fourth face (54) is longer than the circumferential length (dimension L2) of the second face (52), the magnetic path of the magnetic flux generated from the stator magnet (22) and flowing in the circumferential direction is appropriately modulated in the magnetic pole piece (32), and it is possible to suppress a decrease in output torque of the magnetic geared motor (10B).

(3) In some embodiments, in the above configuration (1) or (2), a relation between $\theta_A$ and $\theta_B$ is defined by Expression (1), $\theta_A$ is an angle defined as a value obtained by dividing an area (S) of a region surrounded by an outer contour (60) of the magnetic pole pieces (32) in a radial cross section of the magnetic pole pieces (32) by a length (dimension Lr) of the magnetic pole pieces (32) in the radial direction and a length (dimension Ls) from a rotation center (O) to a midpoint (Cr) of the magnetic pole pieces (32) in the radial direction, and $\theta_B$ is an angle defined, in regard to each of the two magnetic pole pieces (32) adjacent in the circumferential direction, as a positive difference value of an angular position of each of the two magnetic pole pieces (32) with respect to the rotation center (O).

$$\theta_A \leq 0.670 \theta_B \quad \text{Expression (1)}$$

With the above configuration (3), since $\theta_A$ is not greater than $0.670\theta_B$, the high pull out torque of the magnetic geared rotating machine (10) is realized.

(4) In some embodiments, in the above configuration (3), the relation between $\theta_A$ and $\theta_B$ is defined by Expression (2).

$$\theta_A \geq 0.540 \theta_B \quad \text{Expression (2)}$$

With the above configuration (4), since $\theta_A$ is not less than $0.540\theta_B$, the high pull out torque of the magnetic geared rotating machine (10) is realized.

(5) In some embodiments, in any of the above configurations (1) to (4), a relation between L1 which is the circumferential length of the first face (51) and L2 which is the circumferential length of the second face (52) is defined by Expression (3).

$$0.25L2 < L1 < 0.75L2 \quad \text{Expression (3)}$$

With the above configuration (5), since L1 is greater than 0.25L2, the magnetic path of the magnetic flux generated from the rotor magnet (42) and flowing in the radial direction is secured in the magnetic pole piece (32). The magnetic flux is easily arranged inside the magnetic pole piece (32). Further, since 0.75L2 is greater than L1, the second circumferential length (dimension L2) can sufficiently be elongated and the stator magnet losses in the stator magnet (22) can be reduced.

(6) In some embodiments, in any of the above configurations (1) to (5), the magnetic pole piece rotor (30) includes a connecting bar (36) extending in an axial direction inside an axial hole (86) disposed so as to penetrate the magnetic pole pieces (32) in the axial direction, and a radial position of a center (86C) of the axial hole (86) is closer to the second face (52) than a midpoint (Cr) of the magnetic pole pieces (32) in the radial direction.

With the above configuration (6), the connecting bar (36) extending in the axial direction inside the axial hole (86) can prevent the magnetic pole piece (32) from shifting radially outward by centrifugal force when the magnetic pole piece rotor (30) rotates. Further, since the second circumferential length (dimension L2) is longer than the first circumferential length (dimension L1), more magnetic pole pieces (32) tend to be arranged at positions close to the stator magnet (22). In this regard, since the radial position of the center (86C) of the axial hole (86) is closer to the second face (52) than the radial midpoint (Cr) of the magnetic pole piece (32), the amount of the magnetic pole piece (32) located close to the stator magnet (22) is reduced. Consequently, the arrangement amount of the magnetic pole piece (32) is equalized between the rotor magnet (42) side and the stator magnet (22) side with respect to the radial midpoint (Cr) of the magnetic pole piece (32). Therefore, the magnetic path formed inside the magnetic pole piece (32) is easily arranged.

(7) In some embodiments, in the above configuration (6), the magnetic pole piece rotor (30) includes a plurality of non-magnetic holders (39) for sandwiching each of the plurality of magnetic pole pieces (32) therebetween in the circumferential direction, each of the non-magnetic holders (39) includes a holder surface (37) extending in a direction approaching a circumferential midpoint of the non-magnetic holder (39) as the holder surface (37) goes inward in the radial direction, each of the magnetic pole pieces (32) has: a third face (53) opposed to and in contact with the holder surface (37); and a fourth face (54) located opposite to the third face (53) in the circumferential direction, a length (dimension Lc) in the circumferential direction from the third face (53) to the fourth face (54) is longer than the circumferential length (dimension L2) of the second face (52), and a radial length (dimension Mi) from an inner side face (57) of the first face (51) or the second face (52) located on an inner side in the radial direction to the center (86C) of the axial hole (86) is longer than a maximum radial length (dimension Mw) from an outer side face (58) located opposite to the inner side face (57) to the third face (53).

With the above configuration (7), the connecting bar (36) extending in the axial direction inside the axial hole (86) can prevent the magnetic pole piece (32) from coming off the non-magnetic holder (39) by centrifugal force when the magnetic pole piece rotor (30) rotates. Since the circumferential length (dimension Lc) from the third face (53) to the fourth face (54) is longer than the second circumferential length (dimension L2), more magnetic pole pieces (32) tend to be arranged between the third face (53) and the fourth face (54). In this regard, since the radial length (dimension Mi) from the inner side face (57) to the center (86C) of the axial hole (86) is longer than the maximum radial length (dimension Mw) from the outer side face (58) to the third face (53), the radial position of the axial hole (86) is arranged near the region between third face (53) and fourth face (54). Consequently, the amount of the magnetic pole piece (32) between the third face (53) and the fourth face (54) is reduced. Therefore, the arrangement amount of the magnetic pole piece (32) is equalized between the rotor magnet (42) side and the stator magnet (22) side with respect to the radial midpoint (Cr) of the magnetic pole piece (32). Therefore, the magnetic path formed inside the magnetic pole piece (32) is easily arranged.

(8) In some embodiments, in any of the above configurations (1) to (7), the first face (51) is exposed to a side of the rotor (40), and the second face (52) is exposed to a side of the stator (20).

With the above configuration (8), since both the first face (51) and the second face (52) are exposed, the magnetic flux modulation effect by the magnetic pole piece (32) can be increased.

(9) A power generation system (1) according to at least one embodiment of the present disclosure, includes: a prime mover (2); and the magnetic geared rotating machine (10) as defined in any of the above (1) to (8), which serves as a magnetic geared generator (10A) driven by an input from the prime mover to generate power.

With the above configuration (9), for the same reason described in the above (1), the power generation system (1) is implemented which is capable of reducing the stator magnet losses in the stator magnet (22).

Embodiments of the present disclosure were described in detail above, but the present disclosure is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

REFERENCE SIGNS LIST

1: Power generation system
2: Prime mover
10: Magnetic geared rotating machine
10A: Magnetic geared generator
20: Stator
22: Stator magnet
30: Magnetic pole piece rotor
32: Magnetic pole piece
37: Holder surface
39: Non-magnetic holder
40: Rotor
42: Rotor magnet
51: First face
52: Second face
53: Third face
54: Fourth face
57: Inner side face
58: Outer side face
60: Outer contour
86: Axial hole
86C: Center
Cr: Midpoint

The invention claimed is:

1. A magnetic geared rotating machine, comprising:
a stator which includes a plurality of stator magnets arranged so as to be aligned in a circumferential direction;
a rotor which includes a plurality of rotor magnets arranged so as to be aligned in the circumferential direction, and in which a number of magnetic poles of the plurality of rotor magnets is less than the number of magnetic poles of the plurality of stator magnets; and
a magnetic pole piece rotor which includes a plurality of magnetic pole pieces arranged so as to be aligned in the circumferential direction, wherein
each of the magnetic pole pieces has:
a first face opposed to the rotor in a radial direction; and
a second face opposed to the stator in the radial direction and having a circumferential length longer than a circumferential length of the first face,
the magnetic pole piece rotor includes a plurality of non-magnetic holders arranged in the circumferential direction alternately with the plurality of magnetic pole pieces,
each of the non-magnetic holders includes a holder surface extending in a direction approaching a circumferential midpoint of the non-magnetic holder as the holder surface goes inward in the radial direction,
each of the magnetic pole pieces has:
a third face opposed to and in contact with the holder surface; and
a fourth face located opposite to the third face in the circumferential direction,
a length in the circumferential direction from the third face to the fourth face is longer than the circumferential length of the second face,
$\theta_A \leq 0.67\theta_B$, where
$\theta_A$ is an angle defined as a value obtained by dividing an area of a region surrounded by an outer contour of the magnetic pole pieces in a radial cross section of the magnetic pole pieces by a length of the magnetic pole pieces in the radial direction and a length from a rotation center to a midpoint of the magnetic pole pieces in the radial direction, and
$\theta_B$ is an angle defined, in regard to each of the two magnetic pole pieces adjacent in the circumferential direction, as a positive difference value of an angular position of each of the two magnetic pole pieces with respect to the rotation center.

2. The magnetic geared rotating machine according to claim 1, wherein $\theta_A \geq 0.54\theta_B$.

3. The magnetic geared rotating machine according to claim 1, wherein $0.25L2<L1<0.75L2$, where
L1 is the circumferential length of the first face, and
L2 is the circumferential length of the second face.

4. The magnetic geared rotating machine according to claim 1, wherein
the magnetic pole piece rotor includes a connecting bar extending in an axial direction inside an axial hole disposed so as to penetrate the magnetic pole pieces in the axial direction, and
a radial position of a center of the axial hole is closer to the second face than a midpoint of the magnetic pole pieces in the radial direction.

5. The magnetic geared rotating machine according to claim 4, wherein
the magnetic pole piece rotor includes a plurality of non-magnetic holders for sandwiching each of the plurality of magnetic pole pieces therebetween in the circumferential direction,
each of the non-magnetic holders includes a holder surface extending in a direction approaching a circumferential midpoint of the non-magnetic holder as the holder surface goes inward in the radial direction,
each of the magnetic pole pieces has:
a third face opposed to and in contact with the holder surface; and
a fourth face located opposite to the third face in the circumferential direction,
a length in the circumferential direction from the third face to the fourth face is longer than the circumferential length of the second face, and
a radial length from an inner side face of the first face or the second face located on an inner side in the radial direction to the center of the axial hole is longer than a maximum radial length from an outer side face located opposite to the inner side face to the third face.

6. The magnetic geared rotating machine according to claim 1, wherein
the first face is exposed to a side of the rotor, and
the second face is exposed to a side of the stator.

7. A power generation system, comprising:
a prime mover; and
the magnetic geared rotating machine according to claim 1, which serves as a magnetic geared generator driven by an input from the prime mover to generate power.

* * * * *